US012146350B2

(12) United States Patent
Hwang et al.

(10) Patent No.: US 12,146,350 B2
(45) Date of Patent: Nov. 19, 2024

(54) DOOR LOCKING CONTROL SYSTEM AND METHOD

(71) Applicants: Hyundai Motor Company, Seoul (KR); Kia Corporation, Seoul (KR)

(72) Inventors: Jin Ho Hwang, Cheonan-Si (KR); Dong Eun Cha, Hwaseong-Si (KR); Sang Heon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 225 days.

(21) Appl. No.: 17/875,261

(22) Filed: Jul. 27, 2022

(65) Prior Publication Data

US 2023/0203852 A1 Jun. 29, 2023

(30) Foreign Application Priority Data

Dec. 28, 2021 (KR) ........................ 10-2021-0190028

(51) Int. Cl.
*E05B 81/70* (2014.01)
*E05B 81/08* (2014.01)

(52) U.S. Cl.
CPC .............. *E05B 81/70* (2013.01); *E05B 81/08* (2013.01); *E05Y 2201/462* (2013.01)

(58) Field of Classification Search
CPC ..... E05B 81/70; E05B 81/08; E05Y 2201/462
See application file for complete search history.

(56) References Cited

U.S. PATENT DOCUMENTS 1,081,569 A * 12/1913 Becket .................... C22B 34/32 75/623
4,995,658 A * 2/1991 Shiraki .................. H02K 7/116 292/201
5,758,453 A * 6/1998 Inage ...................... E05F 15/60 49/118
7,267,378 B2 * 9/2007 Drumm ................. E05C 19/163 292/DIG. 60
9,051,764 B1 * 6/2015 Rafter ................. E05B 65/0067
10,120,420 B2 * 11/2018 Bathiche ............... G06F 1/1632
10,704,306 B2 * 7/2020 Schartner ............... E05C 17/56
10,962,136 B2 3/2021 Tolentino
11,022,233 B2 6/2021 Tolentino
11,105,128 B2 * 8/2021 Manolescu ............. E05B 83/36
(Continued)

FOREIGN PATENT DOCUMENTS

KR 10-2016-0059566 5/2016

*Primary Examiner* — Mark A Williams
(74) *Attorney, Agent, or Firm* — Morgan, Lewis & Bockius LLP

(57) ABSTRACT

A door locking control system includes an armature coupled to a door or a door frame around which the door is opened or closed, a magnetic module provided on the door or the door frame to face the armature and operated to be fixedly brought into contact with or separated from the armature by a magnetic force induced from a change in a magnetic circuit occurring due to the rotation of a first magnetic body provided inside of the magnetic module, a detector configured to detect an open state or a closed state of the door, and a controller electrically connected to the detector and configured to control the operation of the magnetic module according to the open state or the closed state of the door detected by the detector.

15 Claims, 7 Drawing Sheets

(56) References Cited

U.S. PATENT DOCUMENTS

| | | | | | |
|---|---|---|---|---|---|
| 2007/0007775 | A1* | 1/2007 | Gallas | E05C 19/16 | 292/251.5 |
| 2008/0169890 | A1* | 7/2008 | Irwin | E05B 47/0002 | 335/228 |
| 2009/0230704 | A1* | 9/2009 | Goddard | E05C 19/163 | 292/251.5 |
| 2009/0273194 | A1* | 11/2009 | Patterson | H01F 7/04 | 335/306 |
| 2010/0188177 | A1* | 7/2010 | Inage | E05B 65/0882 | 335/205 |

* cited by examiner

DOOR LOCKING CONTROL SYSTEM AND METHOD

CROSS REFERENCE TO RELATED APPLICATION

The present application claims priority to Korean Patent Application No. 10-2021-0190028, filed Dec. 28, 2021, the entire contents of which is incorporated herein for all purposes by this reference.

BACKGROUND OF THE PRESENT DISCLOSURE

Field of the Present Disclosure

The present disclosure relates to a technology for controlling a door locking device using a magnetic module.

Description of Related Art

In general, a latch device for locking a vehicle door may be formed in various ways. A striker is fixed to a vehicle body, and a latch device provided with a foul and a latch gear is provided on a door. The latch device provided on the door rotates together with the door and is caught by the striker to restrict the rotation of the door.

The door latch device is operated according to the operation of an inside handle, an outside handle, an inside knob, etc., and a remote controller for operating the latch device may be additionally provided.

As described above, the conventional door latch requires various parts to perform a mechanical locking or unlocking operation, complicating the manufacturing process and increasing the manufacturing cost.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door locking control system in which a magnetic module is coupled to a door frame and an armature is coupled to a door at a position corresponding to the magnetic module to lock or unlock the door through operation of the magnetic module.

To accomplish the above and other objectives, according to various aspects of the present disclosure, there is provided a door locking control system including: an armature coupled to a door or a door frame around which the door is opened or closed; a magnetic module provided on the door or the door frame to face the armature and operated to be fixedly brought into contact with or separated from the armature by a magnetic force induced from a change in a magnetic circuit occurring due to the rotation of a first magnetic body provided inside of the magnetic module; a detector configured to detect an open state or a closed state of the door; and a controller electrically connected to the detector and configured to control the operation of the magnetic module in accordance with the open state or the closed state of the door detected by the detector.

The magnetic module may be provided with a base plate including one side to which the first magnetic body is rotatably coupled, a first contact portion extending from a second side of the base plate to the armature side, a second contact portion extending from the first magnetic body to the armature side, and a second magnetic body connecting the first contact portion and the second contact portion so that as the first magnetic body rotates, the magnetic circuit changes so that the first contact portion and the second contact portion are selectively in contact with the armature.

The magnetic module may be further provided with a coil provided to be wound around the first contact portion and electrically connected to the controller, and the magnetic force of the coil may change in direction under the control of the controller to rotate the first magnetic body.

The system may further include: a housing in which the armature side is opened and the magnetic module is accommodated therein; a pair of guide pins provided on first and second sides of the base plate in the housing and extending toward the armature; and a connection plate connecting the base plate and the guide pins so that when the magnetic circuit is changed according to the rotation of the first magnetic body, the magnetic module is moved toward or away from the armature along the guide pins to be coupled to or decoupled from the armature.

The guide pin may be provided with a bush provided to contact with a front surface of the connection plate at a position where the magnetic module and the armature contact each other, to reduce impact force between the magnetic module and the armature when the magnetic module is moved toward the armature.

The guide pin may be further provided with an elastic member extending rearward from a rear surface of the connection plate and connected to a lower portion of the housing to elastically move the magnetic module away from the armature when the magnetic module is decoupled from the armature.

The armature may be provided on the door, the magnetic module and the housing may be provided on the door frame, and the housing may have an opening provided in the door frame to open, and the first magnetic body may be physically rotated through the opening to unlock the door.

The first contact portion may be provided with a chamfer portion at one end portion, and the armature may be provided with a protrusion protruding to form an inclined portion inclined to correspond to the chamfer portion.

The system may further include a first Hall sensor provided adjacent to the magnetic module to detect a position of the armature when the door is closed, and the detector may detect the open state or the closed state of the door through the detection information from the first Hall sensor.

The system may further include a second Hall sensor configured to detect a hinge rotation angle of the door, and the detector may detect an open state or a closed state of the door through the detection information from the second Hall sensor.

The system may further include an input unit to which a user's door opening/closing intention to open or close the door is input, and the controller may be configured to control the operation of the magnetic module according to the user's door opening/closing intention input to the input unit, in a state in which the closed state of the door is detected by the detector.

In another aspect of the present disclosure, there is provided a door locking control method including: detecting an open state or a closed state of a door; and controlling the operation of a magnetic module depending on the open state or the closed state of the door detected in the detecting.

The method may further include: after detecting the closed state of the door in the detecting, allowing the user's door opening/closing intention to open or close the door to be input, and in the controlling, the magnetic module may be controlled to be fixedly coupled to or decoupled from the armature according to the user's door opening/closing intention input in the inputting.

In the door locking control system according to an exemplary embodiment of the present disclosure, the magnetic module is coupled to the door frame and the armature is coupled to the door at a position corresponding to the magnetic module to lock or unlock the door through operation of the magnetic module, providing an effect of reducing the number of parts and the cost and thus simplifying the manufacturing process, compared to a conventional locking device having a complicated structure, such as a door latch.

Furthermore, coupling or decoupling of the magnetic module and the armature is regulated under the control of the rotation of the first magnetic body through the current flow control of the coil provided in the magnetic module, providing an effect of locking or unlocking the door through simple current control.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
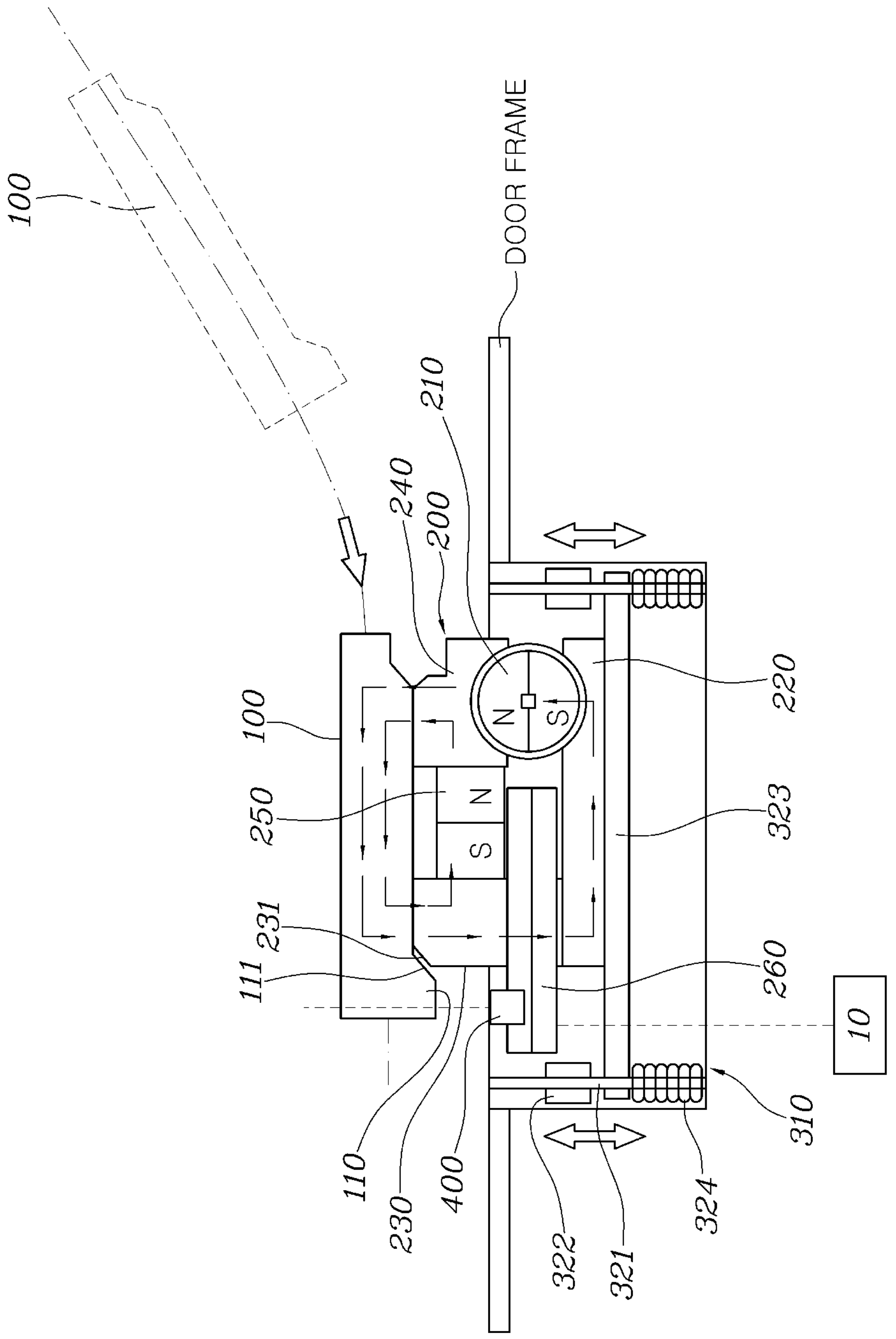
FIG. 1 and FIG. 2 are views exemplarily illustrating the operation of a magnetic module of a door locking control system according to various exemplary embodiments of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of the exemplary embodiments of the present disclosure included herein are merely exemplified for illustrating the exemplary embodiments according to an exemplary embodiment of the present disclosure, and the exemplary embodiments of the present disclosure are implemented in various forms, and may not be construed as being limited to the exemplary embodiments described in the exemplary embodiment or application.

Since the exemplary embodiment according to an exemplary embodiment of the present disclosure can be diversely modified into various forms, specific embodiments will be illustrated and described in detail in the drawings and the description of the present disclosure. However, this is not intended to limit the embodiments according to the concept of the present disclosure to specific disclosure forms, but should be understood to include all modifications, equivalents, or substitutes included in the spirit and scope of the present disclosure.

It will be understood that although the terms "first", "second", etc. may be used herein to describe various elements, these elements should not be limited by these terms. These terms are only used to distinguish one element from another element. For example, a first element could be named a second element and vice versa without departing from the scope according to the concept of the present disclosure.

It should be understood that when an element is referred to as being "connected" or "coupled" to another element, the element may be directly connected or coupled to another element or intervening elements may be present therebetween. In contrast, when an element is referred to as being "directly connected" or "directly coupled" to another element, there are no intervening elements present therebetween. Other expressions describing the relationship between the components, such as "between" and "immediately between" or "neighboring" and "directly neighboring" should also be interpreted in the same manner.

The terminology used herein is only for describing various exemplary embodiments and is not intended to limit the present disclosure. As used herein, the singular forms "a", "an", and "the" are intended to include the plural forms as well, unless the context clearly indicates otherwise. It should be understood that the terms "comprises" and/or "comprising", "includes" and/or "including", or "have" and/or "having" when used in the exemplary embodiment, specify the presence of stated features, integers, steps, operations, elements, components or combinations thereof, but do not preclude the possibility of the presence or addition of one or more other features, integers, steps, operations, elements, components, or combinations thereof.

Unless otherwise defined, the meaning of all terms including technical and scientific terms used herein is the same as that commonly understood by one of ordinary skill in the art to which an exemplary embodiment of the present disclosure pertains. It will be further understood that terms, such as those defined in commonly used dictionaries, should be interpreted as having a meaning which is consistent with their meaning in the context of the relevant art and the present disclosure, and will not be interpreted in an idealized or overly formal sense unless clearly defined herein.

Hereinafter, the present disclosure will be described in detail by describing exemplary embodiments of the present disclosure with reference to the accompanying drawings. Like reference numerals in each figure indicate like elements.

A controller 10, a detector 20, and an input unit 30 according to various exemplary embodiments of the present disclosure may be implemented through a non-volatile memory configured to store data regarding an algorithm configured to control the operation of various components of a vehicle or software instructions for reproducing the algorithm and a processor configured to perform the operations described below using data stored in the corresponding memory. Here, the memory and the processor may be implemented as separate chips. Alternatively, the memory and the processor may be implemented as a single chip integrated with each other. A processor may take the form of one or more processors.

Figure 2:
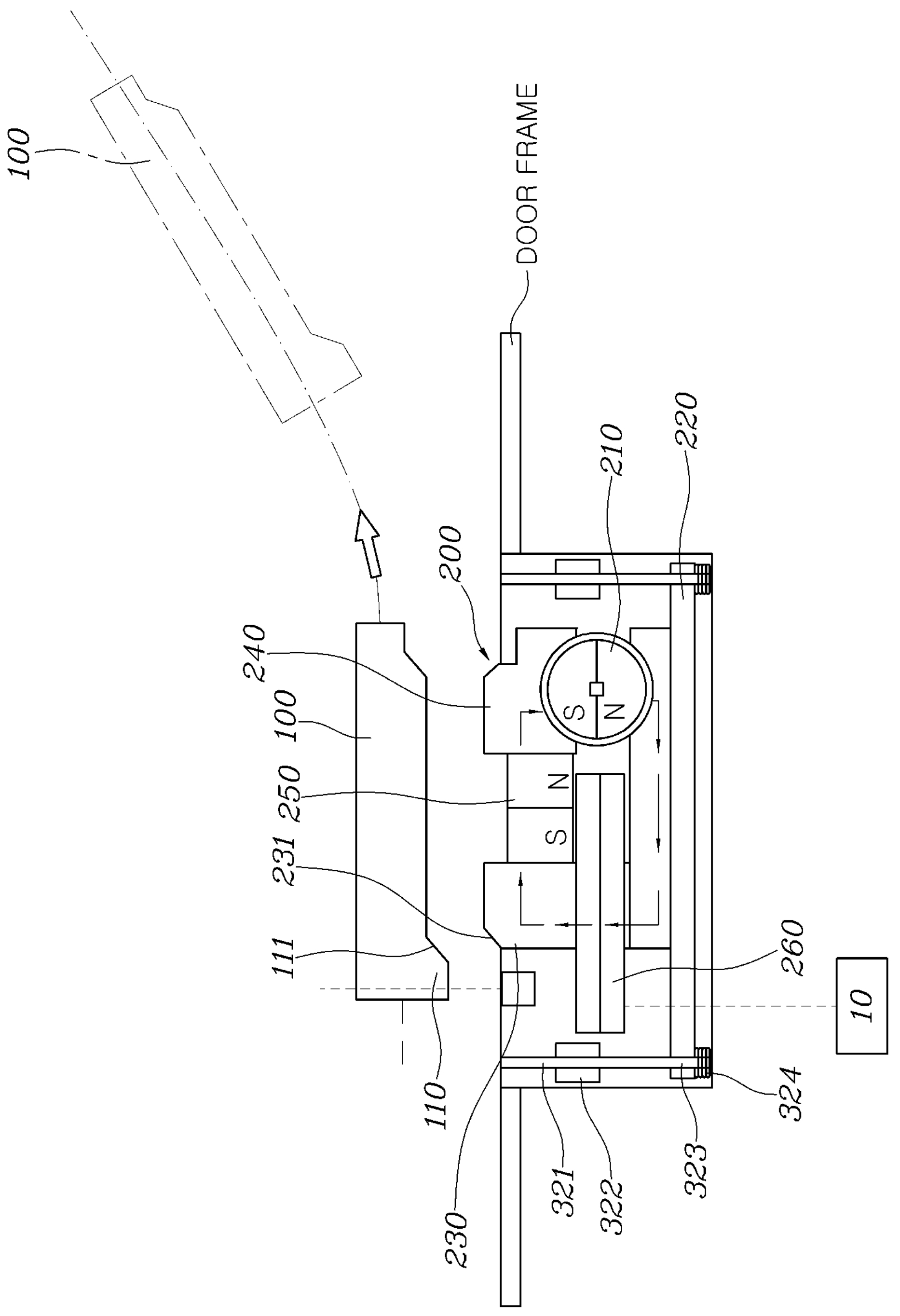
Figure 3:
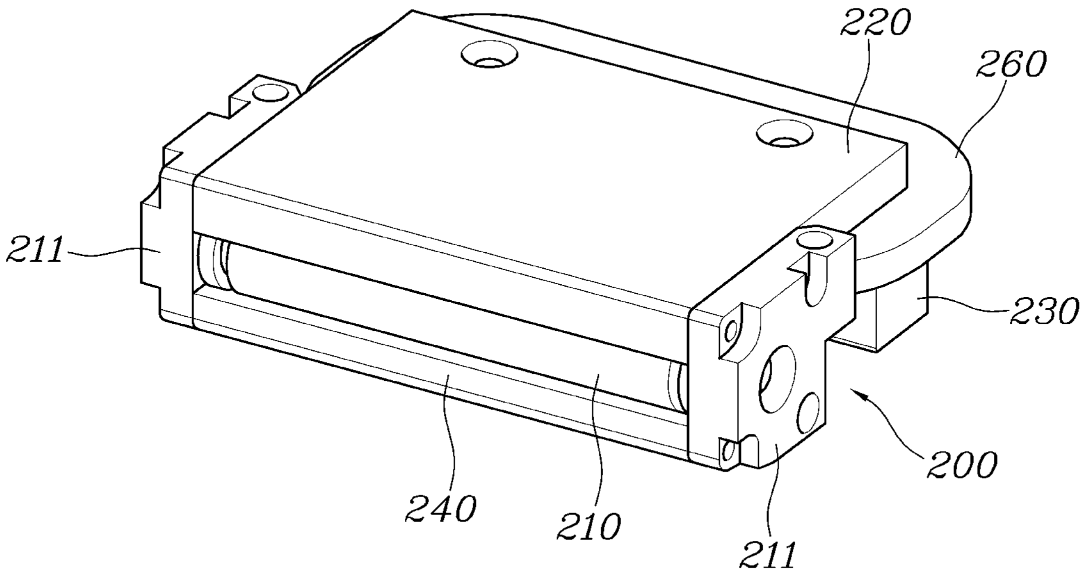
FIG. 3 is a perspective view exemplarily illustrating the magnetic module of the door locking control system according to the exemplary embodiment of the present disclosure.
Figure 4:
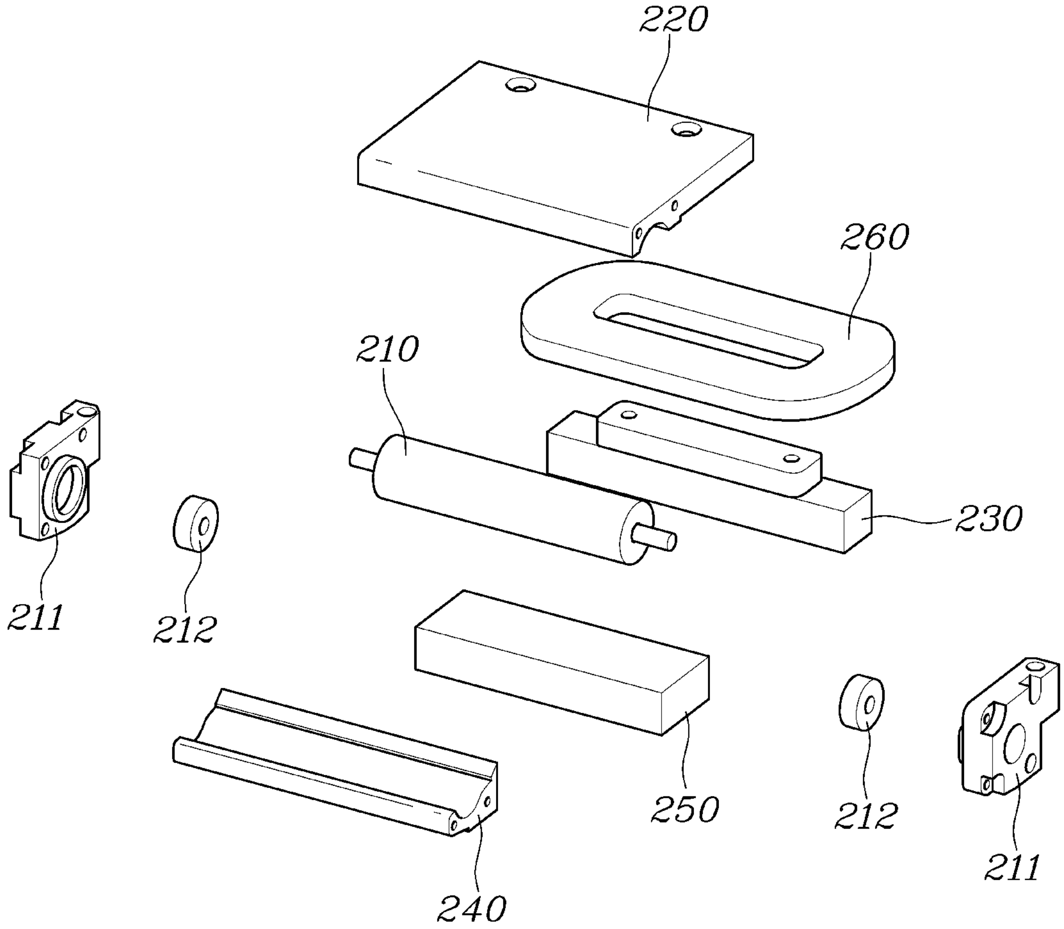
FIG. 4 is an exploded perspective view exemplarily illustrating the magnetic module of the door locking control system according to the exemplary embodiment of the present disclosure.
Figure 5:
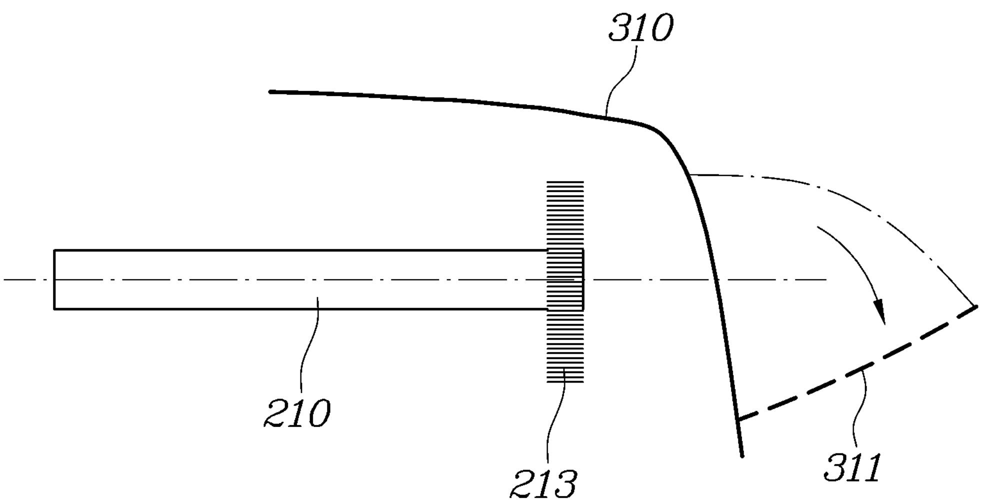
FIG. 5 is a view exemplarily illustrating an opening formed in a housing of the door locking control system according to the exemplary embodiment of the present disclosure.
Figure 6:
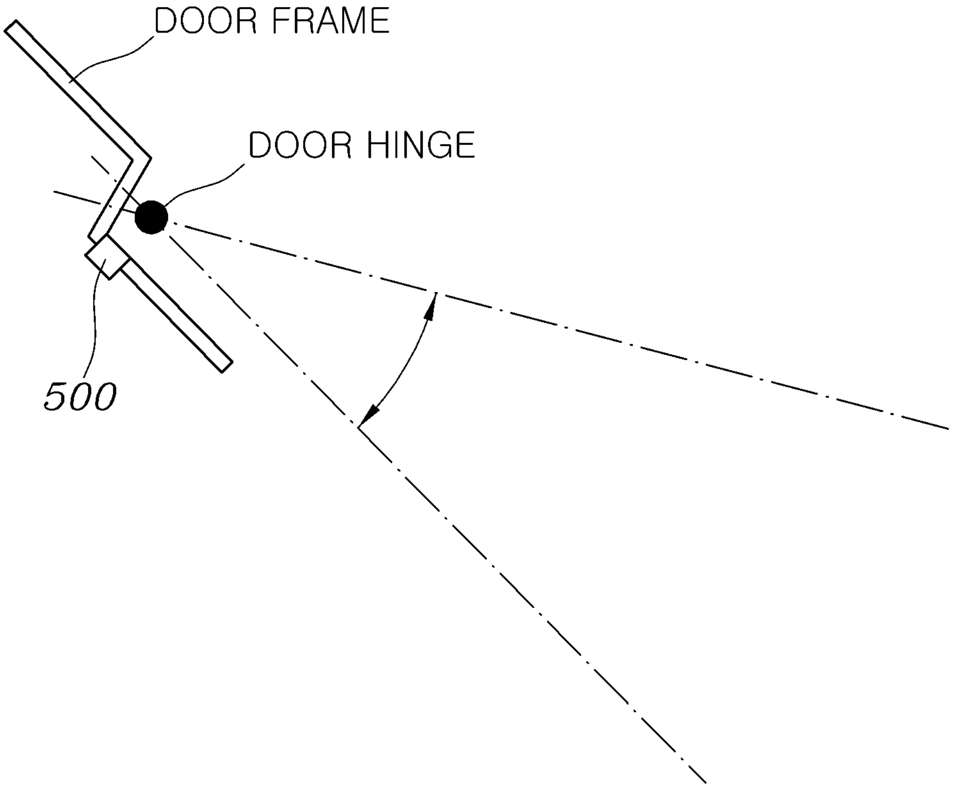
FIG. 6 is a view exemplarily illustrating a second Hall sensor of the door locking control system according to the exemplary embodiment of the present disclosure.
Figure 7:
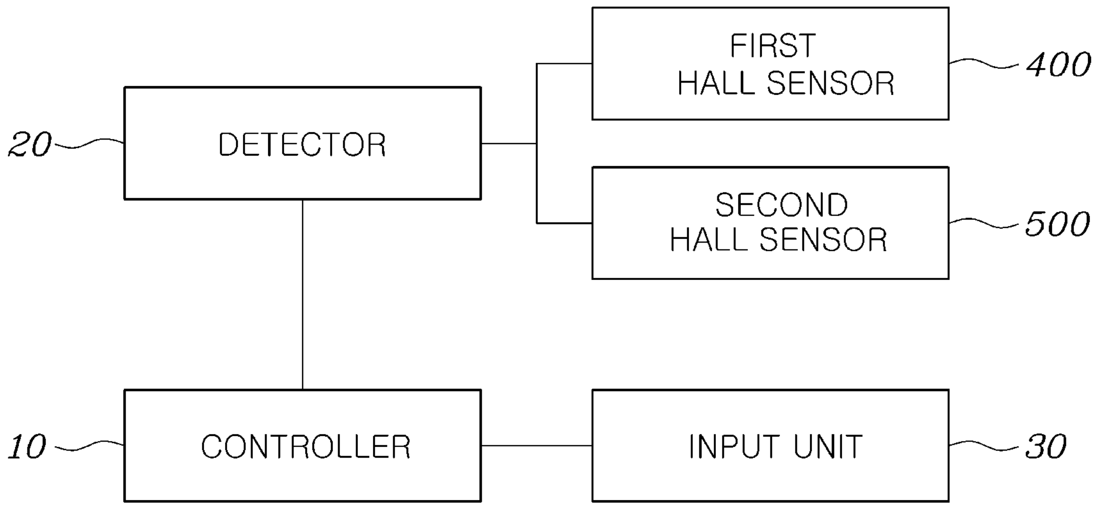
FIG. 7 is a block diagram illustrating the door locking control system according to the exemplary embodiment of the present disclosure.

FIG. 1 and FIG. 2 are views exemplarily illustrating the operation of a magnetic module 200 of a door locking control system according to various exemplary embodiments of the present disclosure, FIG. 3 is a perspective view exemplarily illustrating the magnetic module 200 of the door locking control system according to the exemplary embodiment of the present disclosure, FIG. 4 is an exploded perspective view exemplarily illustrating the magnetic module 200 of the door locking control system according to the exemplary embodiment of the present disclosure, FIG. 5 is a view exemplarily illustrating an opening formed in a housing 310 of the door locking control system according to the exemplary embodiment of the present disclosure, FIG. 6 is a view exemplarily illustrating a second Hall sensor 500 of the door locking control system according to the exemplary embodiment of the present disclosure, and FIG. 7 is a block diagram illustrating the door locking control system according to the exemplary embodiment of the present disclosure.

With reference to FIGS. 1 to 7, an exemplary embodiment of the door locking control system according to an exemplary embodiment of the present disclosure will be described.

The present disclosure is directed to a door locking control system to control a door locking device applied to a vehicle door to lock the door in a closed state and unlock the door.

Conventionally, for locking or unlocking of the vehicle door, a latch may be mechanically locked or unlocked.

However, the conventional mechanical locking device is formed into a complex structure from various parts, causing problems of prolonged manufacturing process and increased manufacturing cost.

The present disclosure is directed to providing a system for controlling a vehicle door locking device using a magnetic body.

The door locking control system according to various exemplary embodiments of the present disclosure may include an armature 100 coupled to either a door or a door frame around which the door is opened or closed; a magnetic module 200 provided on either the door or the door frame to face the armature 100 and operated to be fixedly brought into contact with or separated from the armature 100 by a magnetic force induced from a change in a magnetic circuit occurring due to the rotation of a first magnetic body 210 provided inside of the magnetic module; a detector 20 configured to detect the open state or the closed state of the door; and a controller 10 configured to control the operation of the magnetic module 200 depending on the open state or the closed state of the door detected by the detector 20.

According to various exemplary embodiments of the present disclosure, the armature may be coupled to the door and the magnetic module is coupled to the door frame to lock the door.

The armature 100 may be mounted on the door in a direction in which the door is closed and may be formed of a material which may be coupled to a magnetic material.

The magnetic module 200 may be mounted on the frame side of the door, and as the rotatably mounted first magnetic body is rotated, the internal magnetic circuit may be changed, so that the magnetic module may be coupled to or decoupled from the armature 100 by a magnetic force according to the changed magnetic circuit.

As illustrated in FIG. 1, the armature 100 may be positioned to correspond to the magnetic module 200 when the door is closed, and the magnetic module 200 may rotate the first magnetic body 210 under the control of the controller 10, so that as a magnetic path is changed, the magnetic module 200 may be coupled to the armature 100 to lock the door. The door is locked when the magnetic circuit is changed according to the directions of the N and S poles of the first magnetic body illustrated in FIG. 1.

Furthermore, as illustrated in FIG. 2, when the door is unlocked from the locked state, the directions of the N and S poles of the first magnetic body 210 vary so that the magnetic circuit is changed, which makes it possible to release the coupled stage of the magnetic module 200 and the armature 100 by the magnetic force.

The detector 20 may detect the closed state of the door or the position of the armature 100, and the controller 10 may control the magnetic module 200 to lock the door based on the information confirming the closed state of the door by the detector 20.

With these configurations, the present disclosure can simplify the manufacturing process and reduce the manufacturing cost by simply locking or unlocking the door through the control over the magnetic module 200, compared to the conventional mechanical door locking configuration.

In an exemplary embodiment of the present disclosure, the magnetic module 200 may be provided with a base plate 220 including one side to which the first magnetic body 210 is rotatably coupled, a first contact portion 230 extending from the other side of the base plate 220 toward the armature 100, a second contact portion 240 extending from the first magnetic body 210 toward the armature 100, and a second magnetic body 250 connecting the first contact portion 230 and the second contact portion 240 so that as the first magnetic body 210 rotates, the magnetic circuit changes so that the first contact portion 230 and the second contact portion 240 are fixedly in contact with the armature 100.

The base plate 220, the first contact portion 230, and the second contact portion 240 may all be formed of a diamagnetic material through which magnetic force passes, and the first magnetic body 210 and the second magnetic body 250 may be formed of an antimagnetic material. The armature 100 may also be formed of a diamagnetic material.

In an exemplary embodiment of the present invention, the second magnetic body 250 is a permanent magnet.

As illustrated in FIG. 1, FIG. 2, FIG. 3, and FIG. 4, the first magnetic body 210 may be rotatably formed on one side of the base plate 220, and on the other side of the base plate 220, the first contact portion 230 extending toward the armature 100 is provided and the second magnetic body 250 extending from the first magnetic body 210 toward the armature 100 is provided so that the first contact portion 230 and the second contact portion 240 may be in contact with the armature 100.

As illustrated in FIG. 4, a bearing 211 may be coupled to both end portions of the first magnetic body 210. The bearing 211 may be coupled to a bearing housing 212, which may connect the base plate 220 and the second contact portion 240.

Furthermore, the second magnetic body 250 is fixedly provided to connect the first contact portion 230 and the second contact portion 240, and as the first magnetic body 210 rotates, the opposite magnetic poles of the second magnetic body 250 and the first magnetic body 210 are the same as or different from each other so that the magnetic circuit is changed, which makes it possible to fixedly couple or decouple the first contact portion 230 and the second contact portion 240 to or from the armature 100.

The magnetic module 200 may be further provided with a coil 260 provided to be wound around the first contact portion 230 and connected to the controller 10, and the magnetic force of the coil 260 may change in direction under the control of the controller 10 to rotate the first magnetic body 210.

As an exemplary embodiment of an actuator for rotating the first magnetic body 210, a coil 260 is provided to be wound around the first contact portion 230 so that the coil 260 is connected to the controller 10 so that the magnetic field may be changed according to the current flow controlled by the controller 10.

As illustrated in FIG. 1 and FIG. 2, the magnetic field may change according to the direction of the current flowing through the coil 260, and accordingly, the first magnetic body can rotate to change the direction of the magnetic pole of the second magnetic body 250.

In FIG. 1, the first magnetic body 210 and the second magnetic body 250 are positioned so that the opposite magnetic poles thereof facing each other are the same to allow the magnetic circuit to be changed so that the armature 100 and the magnetic module 200 are in contact with and fixed to each other. In FIG. 2, the first magnetic body 210 and the second magnetic body 250 are positioned so that the magnetic poles facing each other are different from each other to allow the magnetic circuit to be changed so that the fixed state of the armature 100 and the magnetic module 200 may be released.

With the present configuration, the first magnetic body 210 may be rotated by a change in the flow direction of the current flowing through the coil 260, and accordingly, the first magnetic body 210 may be rotated without a separate motor, providing an effect of reducing cost and simplifying manufacturing.

The system may further include: a housing 310 in which the armature 100 side is opened and the magnetic module 200 is accommodated therein; a pair of guide pins 321 provided on both sides of the base plate 220 in the housing 310 and extending toward the armature 100; and a connection plate 323 connecting the base plate 220 and the guide pins 321 so that when the magnetic circuit is changed according to the rotation of the first magnetic body 210, the magnetic module 200 is moved toward or away from the armature 100 along the guide pins 321 to be coupled to or decoupled from the armature 100.

As illustrated in FIG. 1 and FIG. 2, the magnetic module 200 may be accommodated in the housing 310 coupled to the door frame, and the guide pins 321 extending toward the armature 100 may be provided inside of the housing 310, and the connection plate 323 coupled to be connected to the guide pins 321 may be coupled to the base plate 220.

With the present configuration, in a state in which the magnetic module 200 and the armature 100 are decoupled from each other, the magnetic module 200 may be accommodated inside of the housing 310 and protected from the outside, and when the magnetic circuit is changed by the rotation of the second magnetic body, the sliding motion of magnetic module 200 is guided along the direction extending from the guide pins 321 so that the magnetic module may be easily fixed to the armature 100.

The guide pin 321 may be provided with a bush 322 provided to contact with a front surface of the connection plate 323 at a position where the magnetic module 200 and the armature 100 contact.

As illustrated in FIG. 1 and FIG. 2, when the magnetic module 200 is magnetically coupled to the armature 100, the magnetic module 200 may be moved from the inside to the outside of the housing 310, and at the instant time, the first contact portion 230, the second contact portion 240, or the armature 100 may be damaged.

To prevent such a problem, the guide pin 321 may be provided with a bush 322 provided to be spaced apart by the length at which the magnetic module 200 is moved toward the armature 100 from the lower end portion.

When the magnetic module 200 is moved toward the armature 100 so that the magnetic module 200 is brought into contact with the armature 100, the connection plate 323 comes into contact with the bush 322 to alleviate the impact occurring upon the contact between the magnetic module 200 and the armature 100, providing an effect of preventing the first contact portion 230, the second contact portion 240, or the armature 100 from being damaged.

The guide pin 321 may be further provided with an elastic member 324 extending rearward from a rear surface of the connection plate 323 and connected to a lower portion of the housing 310 to elastically move the magnetic module 200 away from the armature 100 when the magnetic module 200 is decoupled from the armature 100.

When the coupled state of the magnetic module 200 and the armature 100 is released according to the rotation of the first magnetic body 210, the magnetic module 200 needs to be accommodated in and protected by the housing 310.

At the present time, to accommodate the magnetic module 200 into the housing 310, an elastic member 324 connecting the lower surface of a receiving space inside of the housing 310 and the lower surface of the connection plate 323 may be provided, and the magnetic module 200 having protruded to the outside of the housing 310 may be elastically accommodated in the housing 310 by the elastic member 324.

The housing 310 may be provided with an opening provided inside of the door frame, and the first magnetic body 210 may be physically rotated through the opening to unlock the door.

As illustrated in FIG. 5, an opening which may be opened through the housing 310 may be provided inside of the door frame.

In a state in which the magnetic module 200 is fixed to the armature 100, when a problem occurs in which the magnetic module 200 cannot be operated normally, such as an electrical signal error, the door needs to be physically opened. At the instant time, the user can open the opening 311 to open the door and then physically rotate the first magnetic body 210, and accordingly, the magnetic circuit of the magnetic module 200 may be changed so that the coupled state of the magnetic module 200 and the armature 100 may be released.

Furthermore, a rotation guide 213 may be coupled to a rotation shaft of the first magnetic body 210 to rotate the first magnetic body 210 through the opening using the user's hand or tool.

Through this, there is an effect that the door may be opened in an emergency by physically unlocking the door.

The first contact portion 230 may be provided with a chamfered portion 231 at one end portion, and the armature 100 may be provided with a protrusion 110 that protrudes to form an inclined portion 111 inclined to correspond to the chamfer portion 231.

The chamfered portion 231 may be formed at one edge portion of the end portion of the first contact portion 230, and the armature 100 may have a protrusion 110 so that an inclined portion 111 corresponding to the chamfered portion 231 is provided.

Through this, when the magnetic module 200 and the armature 100 are coupled to each other, the inclined portion 111 can guide the magnetic module 200 and the armature 100 so that they are coupled to each other at the correct position, and there is an effect that the sealing between the armature 100 and the magnetic module 200 may be strengthened.

The system may further include a first Hall sensor 400 provided adjacent to the magnetic module 200 to detect the position of the armature 100 when the door is closed, and the detector 20 may detect the open state or the closed state of the door through the detection information detected by the first Hall sensor 400.

As illustrated in FIG. 1, the housing 310 may be provided with the first Hall sensor 400 provided to accurately detect the position of the armature 100 when the armature 100 moves to a position corresponding to the magnetic module 200.

When the first Hall sensor 400 detects that the armature 100 is at a normal position corresponding to the magnetic module 200 after the door is closed, the first Hall sensor 400 is connected to the detector 20 to transmit a detection signal to the detector 20. Accordingly, the detector 20 may transmit the detection signal to the controller 10, which in turn operates the magnetic module 200.

Through this, there is an effect that the magnetic module 200 may be operated so that the magnetic module 200 and the armature 100 may be coupled at an accurate position.

Furthermore, when the first Hall sensor 400 detects that the armature 100 is not at a position corresponding to the magnetic module 200, the detector 20 may detect that the door is not closed, and the controller 10 may not operate the magnetic module 200.

The system may further include a second Hall sensor 500 configured to detect a hinge rotation angle of the door, and the detector 20 may detect an open state or a closed state of the door through the detection information from the second Hall sensor 500.

The second Hall sensor may be provided adjacent to the hinge at which the door is rotated to detect the rotation angle of the door, which can detect that the door is normally closed.

When the second Hall sensor 500 detects the rotation angle of the door to predict a normal position where the armature 100 corresponds to the magnetic module 200, the second Hall sensor 500 is connected to the detector 20 to transmit a detection signal to the detector 20. Accordingly, the detector 20 transmits the detection signal to the controller 10, which in turn operates the magnetic module 200.

Through this, there is an effect that the magnetic module 200 may be operated so that the magnetic module 200 and the armature 100 may be coupled to each other at an accurate position.

Furthermore, when the second Hall sensor 500 detects that the door is not normally closed, the detector 20 determines that the door is not closed, and the controller 10 may not operate the magnetic module 200.

The system may further include an input unit 30 to which a user's door opening/closing intention to open or close the door is input, and the controller 10 may control the operation of the magnetic module 200 in accordance with the user's door opening/closing intention input to the input unit 30 when the closed state of the door is detected by the detector 20.

The present disclosure may be applied to a vehicle door so that an input unit 30 to which a user's door opening/closing intention to open or close a door is input is provided, and the input unit 30 transmits a user's door-opening/closing intention signal to the controller 10, which can close the door. In the instant case, when the detector 20 does not detect the normal closing of the door, the controller 10 may not operate the magnetic module 200 even if the intention to open or close the door is input to the input unit 30.

Figure 8:
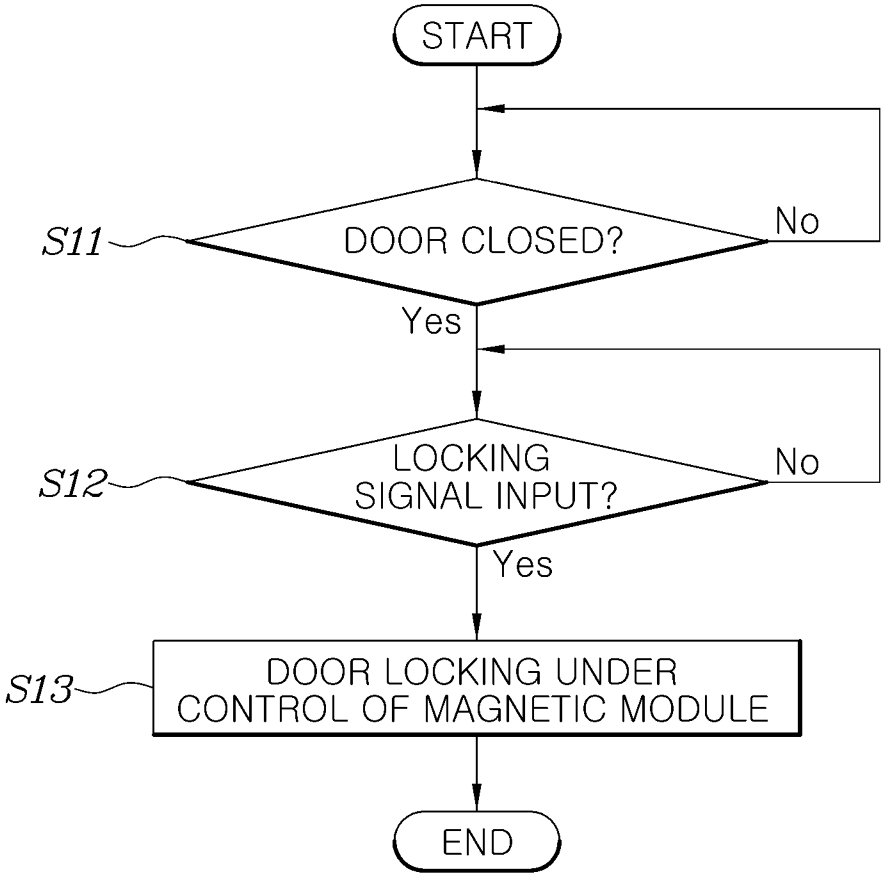
FIG. 8 is a flowchart illustrating a door locking control method according to various exemplary embodiments of the present disclosure.

FIG. 8 is a flowchart illustrating a door locking control method according to various exemplary embodiments of the present disclosure.

An exemplary embodiment of the door locking control method according to an exemplary embodiment of the present disclosure will be described with reference to FIG. 8.

The door locking control method includes: (S11) detecting an open state or a closed state of a door; and (S13) controlling the operation of a magnetic module 200 depending on the open state or the closed state of the door detected in the detection step (S11).

The method may further include: (S12) after detecting the closed state of the door in the detection step, allowing the user's door opening/closing intention to open or close the door to be input, and in control step, the magnetic module 200 may be controlled to be fixedly coupled to or decoupled from the armature 100 according to the user's door opening/closing intention input in the input step.

Furthermore, when the door-opening intention is input in the door-opening/closing intention input step (S12), in the control step (S13), the magnetic module 200 may be controlled so that the coupled state of the armature 100 and the magnetic module 200 is released.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

The scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium having such software or commands stored thereon and executable on the apparatus or the computer.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door locking control system having a door and a door frame, the door locking control system comprising:
- an armature coupled to the door or the door frame to which the door is coupled;
- a first magnetic body rotatably mounted in the door or the door frame;
- a magnetic module provided on the door or the door frame to face the armature and brought into contact with or separated from the armature by direction change of a magnetic force occurring due to rotation of the first magnetic body provided inside of the magnetic module;
- a detector configured to detect an open state or a closed state of the door; and
- a controller electrically connected to the detector and configured to control the magnetic module according to the open state or the closed state of the door detected by the detector, wherein the magnetic module includes:
- a base plate including a first side to which the first magnetic body is rotatably coupled;
- a first contact portion extending from a second side of the base plate to an armature side;
- a second contact portion extending from the first magnetic body to the armature side; and
- a second magnetic body provided between the first contact portion and the second contact portion to be connected with the first contact portion and the second contact portion,
- wherein in response that the first magnetic body rotates, the first contact portion and the second contact portion are in contact with the armature or separated from the armature by the direction change of the magnetic force.

2. The door locking control system of claim 1, wherein the second magnetic body is a permanent magnet.

3. The door locking control system of claim 1,
- wherein the magnetic module further includes a coil provided to be wound around the first contact portion and electrically connected to the controller, and
- wherein a magnetic force of the coil selectively changes in direction under control of the controller to rotate the first magnetic body.

4. The door locking control system of claim 1, further including:
- a housing in which the armature side is opened and the magnetic module is accommodated therein;
- a pair of guide pins provided on first and second sides of the base plate in the housing and extending toward the armature; and
- a connection plate connected to the base plate and slidably coupled to the guide pins,
- wherein in response to rotation of the first magnetic body, the magnetic module is moved toward or away from the armature along the guide pins to be coupled to or decoupled from the armature.

5. The door locking control system of claim 4, wherein the guide pins include a bush provided to contact with a front surface of the connection plate at a position where the magnetic module and the armature contact each other, to reduce impact force between the magnetic module and the armature when the magnetic module is moved toward the armature.

6. The door locking control system of claim 4, wherein the guide pins further include an elastic member extending rearward from a rear surface of the connection plate and connected to a lower portion of the housing to elastically move the magnetic module away from the armature when the magnetic module is decoupled from the armature.

7. The door locking control system of claim 4, wherein the armature is provided on the door, the magnetic module and the housing are provided on the door frame, the housing has an opening provided in the door frame to open, and the first magnetic body is configured to be physically rotated through the opening to unlock the door.

8. The door locking control system of claim 7, wherein the first magnetic body includes a rotation guide.

9. The door locking control system of claim 1, wherein the first contact portion includes a chamfered portion at an end portion of the first contact portion, and wherein the armature includes a protrusion protruding to form an inclined portion inclined to correspond to the chamfered portion.

10. The door locking control system of claim 1, further including:

a first Hall sensor provided adjacent to the magnetic module to detect a position of the armature when the door is closed, wherein the detector is configured to detect the open state or the closed state of the door through detection information obtained from the first Hall sensor.

11. The door locking control system of claim 1, further including:

a second Hall sensor configured to detect a hinge rotation angle of the door, wherein the detector is configured to detect the open state or the closed state of the door through detection information obtained from the second Hall sensor.

12. The door locking control system of claim 1, further including:

an input unit to which a user's door opening/closing intention to open or close the door is input, wherein the controller is configured to control operation of the magnetic module in accordance with the user's door opening/closing intention input to the input unit, in a state in which the closed state of the door is detected by the detector.

13. A method of controlling the door locking control system of claim 1, the method comprising:

detecting, by the controller, the open state or the closed state of the door; and controlling, by the controller, operation of the magnetic module in accordance with the open state or the closed state of the door detected in the detecting.

14. The method of claim 13, further including:

after detecting the closed state of the door in the detecting, allowing, by the controller, user's door opening/closing intention to open or close the door to be input to the controller, wherein in the controlling, the magnetic module is controlled by the controller, to be coupled to or decoupled from the armature according to the user's door opening/closing intention input in the inputting.

15. A non-transitory computer readable storage medium on which a program for performing the method of claim 13 is recorded.

* * * * *